United States Patent [19]

Herrle et al.

[11] 4,053,696

[45] Oct. 11, 1977

[54] MANUFACTURE OF VINYLPYRROLIDONE POLYMERS

[75] Inventors: Karl Herrle, Ludwigshafen; Hermann Gausepohl, Mutterstadt; Wolfgang Schwarz, Ludwigshafen, all of Germany

[73] Assignee: BASF Aktiengesellschaft, Ludwigshafen, Germany

[21] Appl. No.: 632,653

[22] Filed: Nov. 17, 1975

[30] Foreign Application Priority Data

Nov. 30, 1974 Germany .............................. 2456807

[51] Int. Cl.$^2$ .............................................. C08F 26/10
[52] U.S. Cl. ...................................... 526/65; 260/30.2; 260/895; 424/80; 526/18; 526/89; 526/204; 526/210; 526/258; 526/264
[58] Field of Search ................. 526/258, 264, 89, 204, 526/210, 65

[56] References Cited

U.S. PATENT DOCUMENTS

| 3,171,784 | 3/1965 | Witwer | 526/263 |
| 3,222,329 | 12/1965 | Grosser et al. | 526/264 |
| 3,296,231 | 1/1967 | Resz et al. | 526/264 |
| 3,459,720 | 8/1969 | Grosser et al. | 526/264 |
| 3,806,317 | 4/1974 | Viout et al. | 526/263 |

Primary Examiner—Harry Wong, Jr.
Attorney, Agent, or Firm—Keil, Thompson & Shurtleff

[57] ABSTRACT

A process for the continuous manufacture of vinylpyrrolidone polymers of low K values, wherein vinylpyrrolidone, with or without comonomers copolymerizable therewith, is polymerized in organic solvents at elevated temperatures and superatmospheric pressures in the presence of a source of free radicals.

8 Claims, No Drawings

MANUFACTURE OF VINYLPYRROLIDONE POLYMERS

The present invention relates to a process for the continuous manufacture of vinylpyrrolidone polymers by polymerization of vinylpyrrolidone, with or without other ethylenic monomers copolymerizable therewith, in a solvent, at elevated temperatures, in the presence of free radical polymerization initiators.

It is known that vinylpyrrolidone can be polymerized in solution by free radical mechanisms. For this purpose, water, alcohols or aromatic hydrocarbons are used as the solvent. Since a subsequent heat treatment to remove unreacted vinylpyrrolidone is more or less impossible because of the heat sensitivity of the polymer, on the one hand, and the high boiling point of the monomer, on the other, the trend is to seek to achieve as complete conversion as possible by batchwise polymerization and by the use of long reaction times. Since, however, this process easily causes discoloration of the polymer and formation of by-products, certain heavy metal complexes are used in addition to the initiators; whilst these complexes shorten the reaction time, they are physiologically not fully safe (cf., eg., U.S. Pat. No. 2,767,159). These disadvantages are the more important, the lower is the desired K value of the polyvinylpyrrolidone. A further disadvantage of batchwise operation is that the space-time yield is very low.

A satisfactory method for the continuous polymerization of vinylpyrrolidone to give low molecular weight polymers has not previously been disclosed. British Pat. No. 919,757 relates to a process for the manufacture of polymeric N-lactams, in which the monomer, together with a polymerization initiator, is fed to a reaction zone in the course of at least half an hour, and is polymerized batchwise in this zone in aqueous solution, at the boiling point of the mixture. This process also suffers from the disadvantages of the above batchwise processes.

It is an object of the present invention to provide a process for the manufacture of N-vinylpyrrolidone homopolymers and copolymers, whereby polymers of narrow molecular weight distribution are obtained with a high space-time yield. The polymers, even with low K values, should be colorless and practically free from impurities.

We have found that this object is achieved by the process described at the outset, if the polymerization is carried out continuously at a pressure above 1 bar, in an organic solvent.

The new process gives N-vinylpyrrolidone polymers with a K value of from 10 to 35, preferably from 12 to 25. The advantage of the process is, above all, that polymers which are practically free from residual monomer and from impurities can be manufactured. Even polymers with a K value of less than 20 are colorless in, eg., a 50% strength solution. To manufacture N-vinylpyrrolidone polymers with a K value of less than 20 the amount of initiator required in the new process is only about one-fourth of the amount which must be employed in conventional processes in order to obtain polymers of low K value. Furthermore, the polymers manufactured according to the invention have a narrower molecular weight distribution than the polymers obtained by batchwise processes. In addition, the process according to the invention gives a space-time yield which is 10 or more times as great as that of the batchwise process. In contrast to the batchwise process, the continuous polymerization process guarantees that an end product of consistent quality is obtained for indefinite periods.

The process according to the invention is used preferentially for the manufacture of N-vinylpyrrolidone homopolymers. However, it is equally possible to manufacture N-vinylpyrrolidone copolymers by polymerizing N-vinylpyrrolidone together with other ethylenic monomers which are copolymerizable with N-vinylpyrrolidone. Examples of suitable monomers copolymerizable with vinylpyrrolidone are vinyl esters, eg. vinyl acetate and vinyl propionate, esters of acrylic acid, esters of methacrylic acid, esters of maleic acid and esters of fumaric acid wherein the alcohol radical is of 1 to 4 carbon atoms, as well as hydroxypropyl acrylate, acrylic acid, methacrylic acid, crotonic acid and also styrene. Of course it is also possible to copolymerize mixtures of several of the said monomers, e.g. a mixture of N-vinylpyrrolidone, vinyl acetate and methyl acrylate. The comonomer content of the vinylpyrrolidone polymers may vary within wide limits, eg. it can be from 0 (corresponding to the manufacture of vinylpyrrolidone homopolymers) to 90% by weight, and preferably from 5 to 70% by weight.

The polymerization of the N-vinylpyrrolidone is carried out in an organic solvent. Examples of suitable solvents are alcohols, eg. methanol, ethanol, n-propanol and i-propanol, ethers, eg. dioxane and tetrahydrofuran, halogen compounds, eg. chloroform, methylene chloride, tetrachloroethane and hexachloroethane, aromatic hydrocarbons, eg. toluene, xylene, cumene and ethylbenzene, and mixtures of the said solvents which are completely miscible with one another, eg. mixtures of isopropanol and cumene, or mixtures of several aromatic hydrocarbons, eg. ethylbenzene and toluene. The preferred solvents are isopropanol, xylene and ethylbenzene. The monomer concentration in the solution is from 5 to 75 percent by weight, preferably from 10 to 50 percent by weight.

The polymerization of the monomers is carried out in the presence of free radical polymerization initiators. In principle, all conventional free radical initiators may be used to manufacture polymers of high K value. Homopolymers of vinylpyrrolidone with K values of up to 35 are, however, preferably manufactured in the presence of dialkyl peroxides, diaryl peroxides, arylalkyl peroxides or mixtures of these peroxides, eg. dicumyl peroxide, di-tert.-butyl peroxide, tert.-butyl cumyl peroxide and 2,2-di-tert.-butyl peroxybutane. The use of di-tert.-butyl peroxide as the polymerization initiator is of particular advantage. The initiator concentration is in general from 0.1 to 5 percent by weight, preferably from 0.5 to 3% by weight, based on monomers.

The reaction mixture may be ab initio contain the total amount of the free radical polymerization initiator; however, the polymerization initiator may also be introduced into the mixture to be polymerized at various points of the reaction zone.

The polymerization is carried out at from 100° to 300° C, preferably from 140° to 220° C. The temperatures are as a rule above the boiling point of the particular solvent used, so that the autogenous pressure is greater than 1 bar. However, the pressure in the reaction zone can also be increased by introduction of, eg., nitrogen or some other inert gas. It is not possible to specify an upper limit for the pressure at which the polymerization is carried out, since this upper value is determined by the design of the particular apparatus used. In general, the process is carried out at from 2 to 100 bars, preferably from 5 to 45 bars.

The polymerization is carried out continuously by, eg., pumping a mixture of N-vinylpryrrolidone, a solvent and an initiator, under a pressure above 1 bar, into a reaction zone in which the reaction takes place at from 100° to 300° C with a mean residence time of from 3 to 120 minutes. The pressure in the polymerization zone is sufficiently high to ensure that the solvent is in the liquid phase. Preferably, the residence time of the reaction mixture in the polymerization zone is from 5 to 50 minutes.

The polymerization zone can consist of a reaction tube, a kettle cascade or a kettle followed by a reaction tube. Preferably, the monomers are polymerized in at least two successive polymerization zones; in that case, one reaction zone can consist of a pressure-resistant kettle and the other of a pressure-resistant tube, preferably a static mixer which can be heated. In order to polymerize the monomers to conversion greater than 99%, the polymerization is carried out in a kettle cascade which preferably consists of three or more kettles. The kettles must be designed to allow heating and to withstand a certain pressure. During the polymerization, the components are mixed thoroughly. For example, the reaction mixture can be stirred in the kettle cascade, or the polymerization unit can comprise, in place of a kettle cascade, a single kettle followed by a reaction tube equipped, eg., with a static mixer. The polymerization is carried out continuously by discharging, per unit time, the same amount by weight of polymerized mixture from the polymerization zone as the amount of monomer mixture fed to the zone.

The reaction mixture can be worked up by drying it directly, eg. by spray drying, drum drying or freeze drying, or by first distilling off part of the solvent, then taking up the residue in water, and thereafter spray drying or freeze drying the aqueous solution.

The polyvinylpyrrolidones manufactured by the above process may be used for injections in human medicine and veterinary medicine, and also as dispersing agents, solubilizing agents and agents which improve the compatibility of certain active ingredients. Furthermore, they may be used to stabilize deep-frozen blood corpuscles or other deep-frozen tissues. They may furthermore be used for the manufacture of a special polyvinylpyrrolidone-iodine formulation which after resorption through open wounds or in the course of surgery, is eliminated by the body. Copolymers of vinylpyrrolidone are used for various purposes; eg. copolymers of vinylpyrrolidone and vinyl acetate are used in the manufacture of hair sprays.

The invention is explained in more detail by the Examples which follow. The K values were determined by the method of Fikentscher, Cellulose-Chemie 13 (1932), 58–64 and 71–74, in 5% strength aqueous solutions at 20° C; $K = k.10^3$. The molecular weights mentioned in the Examples are number-average molecular weights and were measured by means of a vapor pressure osmometer (Mechrolab). The N-vinylpyrrolidone content of the polymers was determined by titration. In the Examples, parts and percentages are by weight.

EXAMPLE 1

A mixture of 50 parts of vinylpyrrolidone, 49 parts of isopropanol and 1 part of di-tert.-butyl peroxide is pumped at the rate of 7 l/hr into a kettle cascade comprising 3 0.7 l reactors connected in series, and is polymerized at 180° C under a pressure of 25 bars of nitrogen. The total residence time of the reaction mixture in the reaction zone is 20 minutes. At the end of the reaction zone, an amount by weight of reaction mixture corresponding to the amount run in is taken off. The conversion is 99.3%. The reaction mixture is worked up by first distilling off about 70% of the isopropanol, taking up the residue in 5 parts of water and then spray drying the polymer at 130° C. The polymer has a K value of 14.4 (molecular weight 1,440) and is used as a blood plasma substitute. A 50% strength solution of the polymer in water is colorless. The space-time yield is 1.5 kg/l.hr.

EXAMPLE 2

A mixture of 40 parts of N-vinylpyrrolidone, 59.2 parts of isopropanol and 0.8 part of di-tert.-butyl peroxide is passed, at the rate of 8 l/hr, through a polymerization zone which comprises an 0.7 l pressure kettle followed by a pressure tube (1.5 l capacity) equipped with a static mixer. The polymerization temperature is 160° C in the kettle and 185° C in the polymerization tube. The residence time of the mixture is 22 minutes. At the end of the reaction zone, the same amount by weight as that pumped into the reactor at the start of the polymerization zone is taken off. The conversion is 99.5%. The reaction mixture is spray-dried. A polyvinylpyrrolidone which has a K value of 14.2 and is colorless in 50% strength aqueous solution is obtained. The space-time yield is 1.3 kg/l.hr.

EXAMPLE 3

A mixture of 30 parts of vinylpyrrolidone, 70 parts of isopropanol and 2 parts of di-tert.-butyl peroxide is pumped at a rate of 5 l/hr into the kettle of the polymerization unit described in Example 2 and is polymerized at an internal kettle temperature of 170° C and a mixing tube temperature of 185° C. At the same time, a second metering piston pump introduces an 0.02% strength solution of di-tert.-butyl peroxide in isopropanol, at a rate of 0.5 l/hr, through an injection device provided between the kettle and the static mixer. A colorless solution of polyvinylpyrrolidone in isopropanol is taken off at the rate of 5.5 l/hr at the outlet of the polymerization unit. The space-time yield is 0.62 kg/l.hr. A polyvinylpyrrolidone having a K value of 13.7 and containing 0.15% of N-vinylpyrrolidone (monomer) is obtained by spray drying the colorless polymer solution. The mean molecular weight of the polymer is 1,380. The polymer may be used as a blood plasma substitute and for the manufacture of PVP-iodine.

EXAMPLE 4

A solution of 70 parts of N-vinylpyrrolidone, 29 parts of dioxane and 1 part of dicumyl peroxide is pumped at a rate of 1 l/hr through the polymerization apparatus according to Example 2, and is polymerized at an internal kettle temperature of 165° C and a mixing tube temperature of 190° C, under a nitrogen pressure of 35 atmospheres. The residence time is 13 minutes and the space-time yield is 2.85 kg/l.hr. The conversion is in excess of 99.5%. The reaction solution is continuously let down, at a rate of 10 l/hr, through a constant-pressure valve, into a receiver where it is diluted with twice its volume of water; the diluted mixture is then spray-dried at 130° C. The colorless polymer has a K value of 20.3 and a molecular weight of 9,300 and is used, eg., to manufacture PVP-iodine.

EXAMPLE 5

A solution of 80 parts of styrene, 20 parts of vinylpyrrolidone, 25 parts of ethylbenzene and 0.5 part of pinane hydroperoxide is pumped at a rate of 13 l/hr through the polymerization apparatus according to Example 2 and let down at the same rate, through a constant-pressure valve, into a receiver. The internal kettle temperature and the mixing tube temperature are each 235° C, whilst the pressure is 27 atmospheres. The conversion is in excess of 99.6%. The space-time yield is 4.25 kg/l.hr. The ethylbenzene is removed by distillation. A brittle copolymer of molecular weight 1,840 is obtained, which may be employed, eg., as an internal lubricant for styrene polymers.

COMPARATIVE EXAMPLE 1

The mixture of 40 parts of vinylpyrrolidone, 59.2 parts of isopropanol and 0.8 part of di-tert.-butyl peroxide, described in Example 2, is polymerized batchwise, at the boil, under nitrogen. After 6 hours, no further reaction occurs. The space-time yield is only 0.056 kg/l.hr, and the conversion is 93.2%. After working up, a polyvinylpyrrolidone having a K value of 45 is obtained.

COMPARATIVE EXAMPLE 2

Comparative Example 1 is repeated with the modification that in place of 0.8 part, 3.2 parts of di-tert.-butyl peroxide are employed as the free radical polymerization initiator. The conversion is 94.1% after 4 hours, 98.0% after 6 hours and 98.6% after 8 hours. The space-time yield after 8 hours is 0.045 kg/l.hr. Spray drying gives a polyvinylpyrrolidone having a K value of 37.4. This Comparative Example clearly shows that in spite of a 4-fold increase in the initiator added, it is not possible significantly to increase the space-time yield or lower the K value.

COMPARATIVE EXAMPLE 3

The results of Comparative Example 2 suggested accelerating the decomposition of the polymerization initiator, di-tert.-butyl peroxide, by adding 2 ppm of copper acetate.

Hence, a mixture of 40 parts of vinylpyrrolidone, 56.8 parts of isopropanol and 3.2 parts of di-tert.-butyl peroxide was heated to the boil and after reaching this temperature 2 ppm of copper acetate were added. The conversion was 92.3% after 4 hours, 96.9% after 6 hours and 98.7% after 8 hours. The space-time yield does not show an increase and is 0.044 kg/l.hr. The K value is 39.2 and could accordingly not be lowered by adopting this measure.

COMPARATIVE EXAMPLE 4

3.2 parts of tert.-butyl hydroperoxide are added to a solution of 40 parts of vinylpyrrolidone in 56.8 parts of isopropanol and the mixture is heated to the boil. 1 ppm of copper acetate is then added. After a polymerization time of 8 hours, the conversion is only 95.6%. The space-time yield is 0.043 kg/l.hr. The polymer solution is yellow-brown. The polymer has a K value of 14.5. This Comparative Example shows that using different free radical polymerization initiators, the space-time yield is again very low.

We claim:

1. A process for the continuous manufacture of polyvinylpyrrolidone having a K value of from 10 to 35 which comprises: continuously polymerizing a monomer consisting essentially of vinylpyrrolidone in at least one continuous polymerization zone at a temperature of from 100° to 300° C., in the presence of from 0.1 to 5% by weight, based on said monomer, of a free radical initiator selected from the group consisting of dicumyl peroxide, di-tert.-butyl peroxide and 2,2di-tert.-butyl peroxybutane, and in an organic solvent selected from the group consisting of methanol, ethanol, n-propanol, isopropanol, dioxane, tetrahydrofuran, chloroform, methylene chloride, tetrachloroethane, hexachloroethane, xylene, cumene, alkylbenzenes or mixtures thereof, said continuous polymerization being carried out at a pressure greater than 1 bar and within a residence time in the polymerization zone of about 3 to 120 minutes.

2. A process as claimed in claim 1 wherein the concentration of said vinylpyrrolidone monomer in said organic solvent, based on the weight of the solution, is from 5 to 75%.

3. A process as claimed in claim 1 wherein the polymerization is carried out in two or more successive polymerization zones.

4. A process as claimed in claim 1 carried out at a temperature of from 140° to 220° C.

5. A process as claimed in claim 1 carried out to yield a vinylpyrrolidone homopolymer having a K value of from 12 to 25.

6. A process as claimed in claim 1 carried out at a pressure of from 2 to 100 bars.

7. A process as claimed in claim 1 carried out at a pressure of from 5 to 45 bars.

8. A process as claimed in claim 1 carried out within a residence time of 5 to 50 minutes.

* * * * *